United States Patent [19]
Yabuki et al.

[11] 3,958,039
[45] May 18, 1976

[54] METHOD FOR COATING LEAD-ATTACHED ELECTRONIC DEVICE

[75] Inventors: Toshihiro Yabuki; Nobuyuki Yamane; Takumi Tanigawa, all of Kameyama; Shigenori Nakagawa, Suzuka; Toshimasa Tanichi, Kameyama, all of Japan

[73] Assignee: Nitto Denki Kigyo Kabushiki Kaisha (Nitto Electric Industrial Co., Ltd.), Ibaraki, Japan

[22] Filed: July 16, 1974

[21] Appl. No.: 489,049

[30] Foreign Application Priority Data
Mar. 8, 1974 Japan.............................. 49-28326

[52] U.S. Cl................................... 427/58; 118/50; 118/211; 427/82; 427/101; 427/194; 427/195; 427/294; 427/314; 427/428
[51] Int. Cl.²....................... B05D 5/12; B05D 3/02
[58] Field of Search.................. 117/21, 111 D, 119; 118/50, 211; 427/58, 82, 101, 194, 195, 294, 314, 428

[56] References Cited
UNITED STATES PATENTS

| | | | |
|---|---|---|---|
| 2,789,926 | 4/1957 | Finholt et al. | 427/194 X |
| 3,081,737 | 3/1963 | Frantz et al. | 96/1 SD |
| 3,310,431 | 3/1967 | Loose | 117/21 X |
| 3,389,009 | 6/1968 | McNulty et al. | 117/21 X |
| 3,409,280 | 11/1968 | Springett | 117/21 UX |
| 3,479,200 | 11/1969 | Estabrooks | 117/21 |
| 3,617,327 | 11/1971 | Daniel | 117/21 X |
| 3,627,682 | 12/1971 | Hall et al. | 117/235 X |
| 3,645,770 | 2/1972 | Flint | 117/17.5 |
| 3,666,458 | 5/1972 | Arneth et al. | 96/1 TE |
| 3,676,269 | 7/1972 | Schaetti | 156/283 X |
| 3,682,738 | 8/1972 | Smith | 156/283 |
| 3,759,222 | 9/1973 | Maksymiak et al. | 117/17.5 X |

Primary Examiner—Harry J. Gwinnell
Attorney, Agent, or Firm—Wenderoth, Lind & Ponack

[57] ABSTRACT

A method for coating only the element of an electronic device such as resistor, diode or the like having an attached lead or leads with a powder coating. In this method, the electronic device travels on conveying apparatus from one end to the other end thereof, the lead holding the electronic device stably thereon. The electronic device is preliminarily heated during said travel by a preheating furnace thereby partially melting the powder coating which is applied to said device in the following part of the travel, the partially stuck powder coating on said electronic device being cured by passing the device through a secondary heating furnace thereby making it possible to complete the coating of the powder coating on the electronic device. The electronic device is coated by passing the electronic device on the conveyer between spaced opposed rotatable porous coating members having grooves in their peripheries, rotating said coating members to pass the peripheries through powder coating material while applying a vacuum to the coating members for picking up said powder coating material in said grooves.

4 Claims, 4 Drawing Figures

METHOD FOR COATING LEAD-ATTACHED ELECTRONIC DEVICE

The present invention relates to a method for coating an electronic device such as a resistor, diode or the like having a lead or leads attached thereto, and in particular to a method for coating only the element of such a device with a powder coating.

There have been conventional methods for said purpose such as transfer molding, encapsulating by pellet resin, fluid bed coating, electrostatic coating and the like. These conventional methods, however, are defective in various regards. More specifically, the former two methods need a costly press and a precise metallic mold which results in an increased processing cost and a reduction of productivity, and the latter two necessitate preliminary masking of the attached lead thereby requiring a complex mechanism and having a high cost.

In the present invention, the electronic device with the attached lead has the element thereof coated with a powder coating driving traveling on a conveying equipment from one end to the other end thereof, the lead attached to the electronic device supporting the electronic device stably on said conveying equipment, said electronic device during the travel being heated in a preheating and secondary heating furnace before and after going through a coating system wherein the powder coating has been applied.

A main object of the present invention is to provide a method which uses a simple mechanism for coating the element of an electronic device having a powder coating without masking said attached lead.

This and other objects of the present invention can be accomplished by the improvement, combination and operation of every part constituting this invention, the preferred embodiment of which will be described together with the annexed drawings in which.

Figure 1:
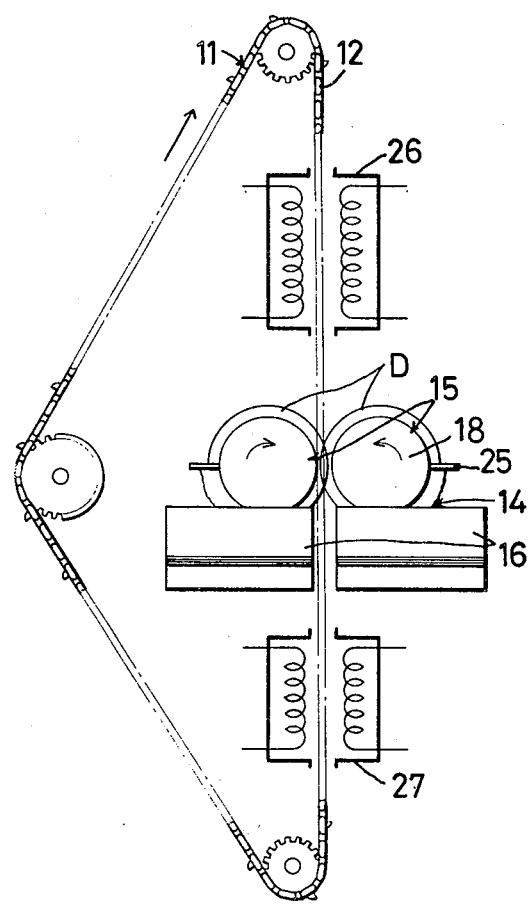
FIG. 1 is a diagrammatic side view showing a coating apparatus of the present invention.
Figure 4:
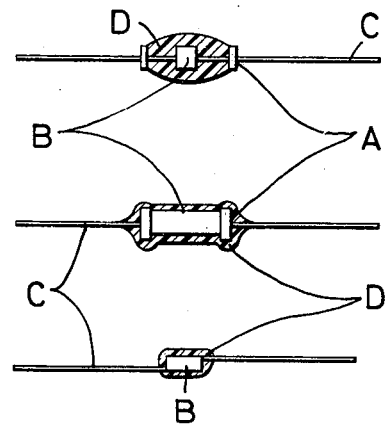
FIG. 4 is a sectional view showing various kinds of electronic devices coated in the apparatus of FIG. 1.
Figure 2:
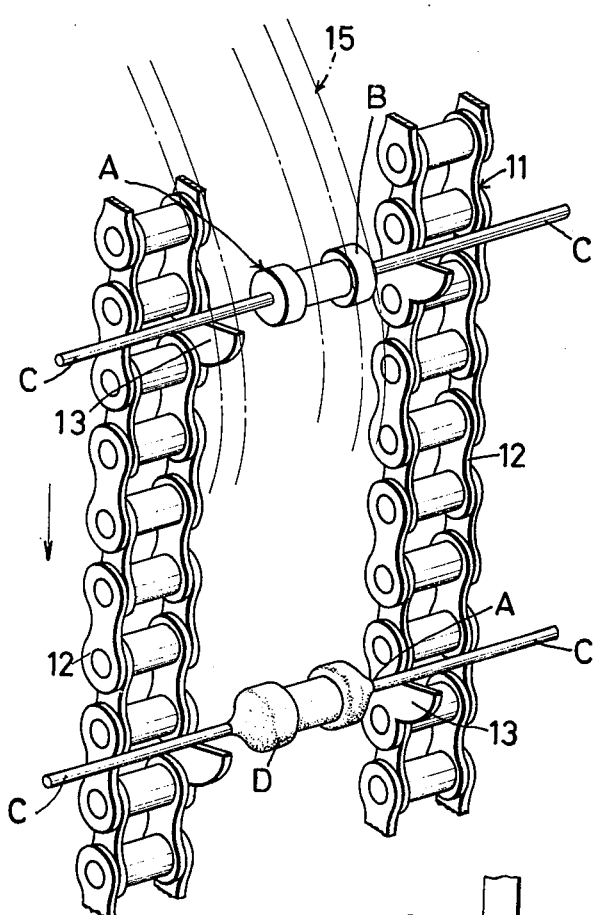
FIG. 2 is a perspective view showing part of a conveying equipment for conveying an electronic device in the apparatus of FIG. 1.
Figure 3:
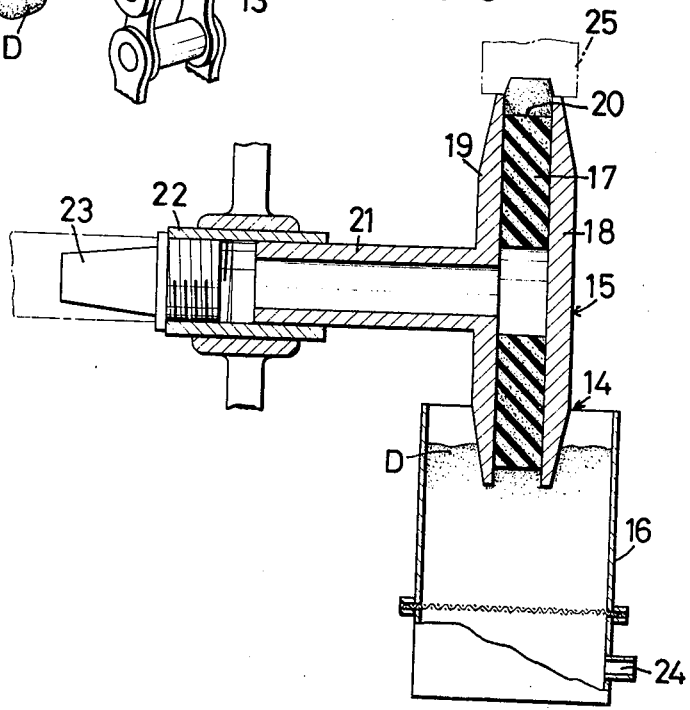
FIG. 3 is a sectional front view of an enlarged scale of an integral part for coating the electronic device in the apparatus of FIG. 1.

In the embodiment shown in FIGS. 1 to 3, numeral 11 designates a conveying apparatus for conveying an electronic device A, said conveying apparatus 11 comprising a pair of endless chain conveyors 12 stretching side by side with predetermined space between them and supported on sprocket wheels 12, lugs 13 being provided on said chain conveyors 12 so as to hold the electronic device A by the leads thereof on the chain conveyors.

The electronic device A is so constructed that the attached leads C project outward at both ends of element B so that leads C are held by said lugs 13 thereby enabling the electronic device A to travel stably on the conveying apparatus 11, as shown in FIG. 2.

The conveying apparatus 11 moves clockwise as shown by the arrows in FIG. 2, said electronic device A being placed on said conveying apparatus 11 at the input end thereof and thereby being conveyed to the other end portion thereof, said conveying apparatus 11 having between the ends thereof a coating system 14 wherein powder coating D is provided for coating the element of the electronic device A on its passage therethrough.

The afore-mentioned coating system 14 comprises a pair of revolving members 15 rotatably mounted so as to have the peripheries opposed to each other while leaving a space in between for allowing the passage therethrough of the element B of the electronic device A, said revolving members 15 at the outer surface thereof having adhered thereto powder coating D, and a tank 16 positioned therebelow for storing and supplying the powder coating D to said revolving members 15.

The revolving members 15, as shown in FIG. 3, each comprise a porous cylindrical member 17 made of synthetic resin, sintered metal or the like, said cylindrical member 17 being sandwiched between two discs 18 and 19 which are made of the same material as the member 17 and which are a bit larger in diameter than the cylindrical member 17, the cylindrical member 17 and the discs 18 and 19 being held together coaxially. Said cylindrical member 17 and discs 18 and 19 at the outer periphery thereof define a groove 20 within which the element B can fit.

Another cylindrical member 21 projects from the disc 19 at the outward side thereof, said cylindrical member 21 communicating with the inside of cylindrical member 17 said cylindrical member 21 at the free end thereof being equipped with a nozzle 23 via a connecting sleeve 22, said nozzle connecting with a vacuum pump (not shown) at its inlet via piping, said vacuum pump producing suction in the groove 20 at the outer periphery of said cylindrical member 17.

The conveying apparatus 11 is so designed that one revolving member 15 rotates clockwise and the other member 15 rotates counterclockwise so that the two members move toward each other at the point of opposition and in the same direction as the moving direction of the electronic device A on the conveying apparatus 11. The nozzle 23 on said connecting sleeve 22 is fixed and is coupled with the revolving members 15 by sleeve 22.

The tank 16 at its upper opening is fitted to the revolving member 15 and has a port 24 at the lower portion thereof through which air under the suction effect of said vacuum pump flows thereby floating the powder coating such as polyvinyl chloride, nylon, epoxy, polyester resin, acryl resin and the like contained therein, said suction further causing said powder coating to be picked up in the revolving groove 20. Among the powder coatings listed above, thermosetting resin such as epoxy resin, polyester resin, acrylic resin and the like and in particular epoxy resin are preferable in this invention, these resins making it possible to obtain a coating film which is especially advantageous because it is chemical resistant and solid.

Both of the revolving members 15 have at the outer periphery thereof a scraper panel 25 for forming the layer of powder coating D sticking to the groove 20 into a predetermined shape so that the layers of the powder coating D project beyond the peripheries of members 15 and contact each other where the members 15 are opposed. As a result, when the element B passes between the contacting layers D of powder, the powder is applied to the surface of element A under pressing contact.

In the conveying apparatus 11 between the input end and the coating system 14 thereof at a position nearer to the input end is placed a preheating furnace 26 for heating the electronic device A as it moves toward the coating system 14 thereby enabling the element B to partly melt the powder coating which is transferred from the groove 20 to the element B as it travels through the coating system 14, and in between the other terminal and the coating system 14 at a position nearer to the other terminal is placed a secondary heating furnace 27 which gives the finishing touches to the coating by means of additionally heating the element B thereby completely curing the powder coating which has been melted by the heated element.

The coating in this invention for the electronic device can be varied in size and shape as width and diameter of the cylindrical member 7, thereby changing the depth and width of groove 20.

Operation of the embodiment is as follows:

With the start of rotation of the revolving members 15 and the operation of the vacuum pump, the groove on the outer periphery of said revolving members 15 picks up the powder coating from within the tank 16 under the effect of vacuum-caused air flow, the revolving members 15 continuing to revolve in the direction as shown by the arrows in FIG. 1 thereby causing the attached scraper panel 25 to form the powder coating into a predetermined shape. Following the above operation, the electronic device A with attached leads C begins to travel on the conveying apparatus 11 from the input end toward the other end thereof with the leads held on the lugs 13, the electronic device A during the travel passing through the preheating furnace 26 thereby being heated to a temperature required for partly melting the powder coating transferred from the groove 20 to the outer periphery of the element B on its passage through the space between the revolving members 15 thereby forming the preliminary coating, the electronic device A thence reaching the secondary heating furnace 27 whereby it is heated further for the complete curing of the partly melted powder coating coated on the element B thereby completing the coating required in the present invention the electronic device A after the completion of said process being removed manually or by any other suitable means at the other end of said conveying apparatus 11.

An element of an electronic device is difficult to coat with powder coating by conventional methods because of the inefficiency of conventional methods to deal with the thermal capacity problem involved in this kind of small article, i.e. the element of an electronic device which cools off too quickly after the preheating. Characteristically, this invention provides a solution to this problem by shortening the distance between the preheating furnace and the coating system, besides making it possible to obtain a required thickness for the layer of powder coating coated on the element due to the pressing contact of the element with the powder coating on the grooves of the revolving members at the outer periphery thereof.

What is claimed is:

1. A method of coating only an element of an electronic device to which leads are attached with a powder coating of a material which is meltable and curable, comprising the steps of placing the electronic device on a conveyor and holding it on the conveyor by means of the leads, passing the electronic device on the conveyor through a furnace means for preliminarily heating the element to a temperature which will partially melt the coating material upon contact, then passing the electronic device on the conveyor between spaced opposed rotatable porous coating members having grooves in their peripheries substantially the same width as the length of the element, rotating said coating members to pass the peripheries through bodies of powder coating material while applying a vacuum to the coating members for picking up on the peripheries of the coating members a mass of powder coating material which fills the grooves and projects beyond the peripheries of the coating members a distance such that when the coating members rotate past the point at which they are opposed, the powder coating material on one coating member contacts the powder coating material on the other coating member and when an element of an electronic device is between the coating members, the powder coating material is applied thereto from opposite sides thereof under pressing contact, and is partially melted, and then passing the electronic device on the conveyor through a further furnace means for further heating the element for completing the melting and curing of the powder coating material.

2. A method of coating as claimed in claim 1 further comprising the step of shaping the mass of powder coating material on the peripheries of the coating members by passing the rotating members past a scraper member.

3. A method as claimed in claim 1 in which the powder coating material is a thermosetting resin.

4. A method as claimed in claim 1 in which the powder coating material is an epoxy resin.

* * * * *